May 2, 1961 S. G. FRIDEN ET AL 2,982,167

DISTANCE MEASURING DEVICE

Filed Jan. 28, 1958 2 Sheets-Sheet 1

INVENTORS
STEN GUNNAR FRIDEN,
KARL OTTO RAGNAR SCHÖLDSTRÖM,

BY Larson and Taylor
ATTORNEYS

May 2, 1961 S. G. FRIDEN ET AL 2,982,167

DISTANCE MEASURING DEVICE

Filed Jan. 28, 1958 2 Sheets-Sheet 2

INVENTORS
STEN GUNNAR FRIDEN,
KARL OTTO RAGNAR SCHÖLDSTRÖM,

BY Larson and Taylor
ATTORNEYS

United States Patent Office 2,982,167

Patented May 2, 1961

2,982,167

DISTANCE MEASURING DEVICE

Sten Gunnar Friden and Karl Otto Ragnar Schöldström, Lidingo, Sweden, assignors to Svenska Aktiebolaget Gasaccumulator, Lidingo, Sweden, a corporation of Sweden Filed Jan. 28, 1958, Ser. No. 711,709

Claims priority, application Sweden Jan. 31, 1957

7 Claims. (Cl. 88—1)

The invention refers to a distance measuring device of the type transmitting an amplitude modulated light beam, the amplitude modulation of which is obtained in its passage through a Kerr cell, which is controlled by a modulation voltage. The light beam is reflected at an object whose distance is to be determined and is intercepted by a receiver, whose sensitivity is controlled by the modulation voltage. The receiver then produces an output voltage (output current), the means value of which during an interval comprising a plurality of periods of the modulation voltage is dependent upon the phase difference between the modulation of the intercepted light and the modulation voltage applied to the receiver for controlling its sensitivity. If either the light beam or the modulation voltage is made to pass through a controllable phase delaying device before the application to the receiver, any predetermined desired phase relation between the incoming light and the modulation voltage at the receiver is obtainable.

In a device of the type referred to, if the phase of the modulation voltage is reversed, a mean receiver output voltage is obtained, which is again a periodic function of the distance, or, expressed in other terms, of the said phase difference between the modulation of the incoming light and that of the modulation voltage applied to the receiver. As a function of the phase difference, and therefore also of the distance, the new mean output voltage varies about the same mean value but in opposite direction to the first-mentioned case, since a phase reversal is equivalent to a change in distance corresponding to one half-period length for the modulation voltage.

Figures 1, 2, 3, 5, 6:
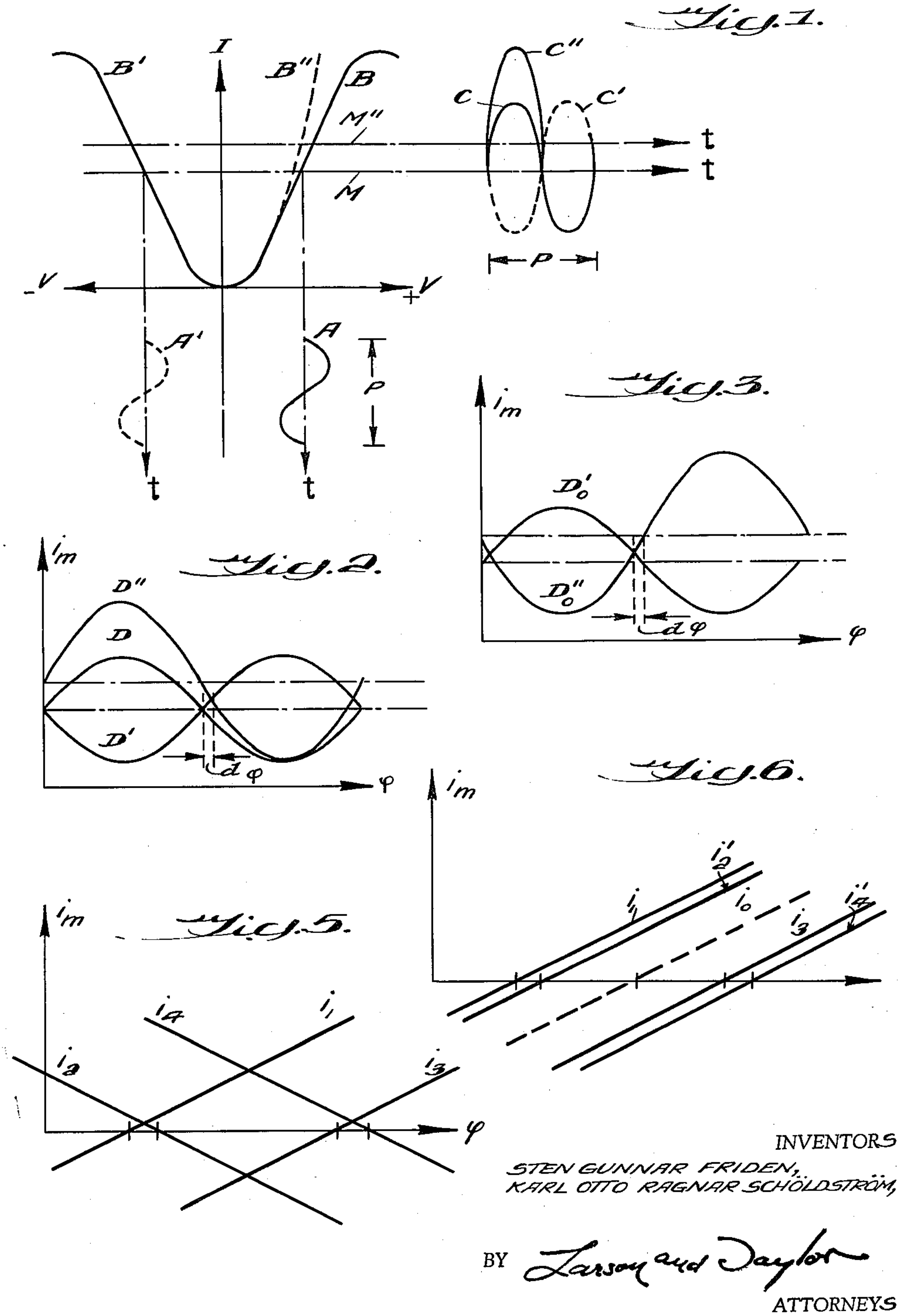

The conditions referred to are illustrated in Figs. 1 and 2.

In Fig. 1, the curve B shows the light stream I passed by the Kerr cell as a function of the voltage V between the electrodes thereof. If there is applied to the cell a constant bias together with a modulation voltage according to curve A, a periodical light variation is obtained about a mean value N according to curve C. Curves A and C show the variation with time *t* of the modulation voltage and the issuing light streams of the cell, respectively, the period of the variation being *p*. The mean current $I_m$ of the receiver as a function of the phase difference $\phi$ between the modulation of the incoming light and the sensitivity-controlling modulation voltage on the receiver then varies according to the curve D in Fig. 2.

If the sense of the modulation of the incoming light is reversed, which implies that curve C in Fig. 1 is replaced by curve C′, a variation in the mean current (or voltage) of the receiver is obtained according to curve D′ of Fig. 2. If the receiver is provided with a measuring instrument for measuring the difference between the currents according to curves D and D′ it is apparent that a zero reading is obtained for certain values of $\phi$ corresponding to the intersections of the two curves referred to.

The above-mentioned phase inversion of the modulation curve for the light can be obtained in a simple way through a reversal of polarity of the bias applied to the Kerr cell, as indicated by the curve A′ of Fig. 1. On the assumption that the Kerr cell characteristic is symmetrical, i.e. that the left-hand branch B′ thereof is a mirror image of the curve B with respect to the ordinate axis, it is easily seen that a variation of the outgoing light according to the curve C′ is obtained.

If however the curve B is not of exactly symmetrical shape with regard to the curve B′ but has a slight deviation, as indicated by the dash curve B″ of Fig. 1, this implies that the function C is replaced by function C″ varying about a mean value M″, which differs from the mean value M of the curve C. The function C″ also has a different amplitude, i.e. a maximum deviation from the mean value, than has the function C. With regard to the mean output voltage from the receiver, this implies a corresponding change of the curve as indicated in Fig. 2 by curve D″. As is apparent from Fig. 2, such lack of symmetry in the Kerr cell characteristic implies that an error is obtained in the measured value, which error is designated in Fig. 2 as $d\phi$.

The object of the invention is to suppress the error referred to in the measured value, which is attained with the aid of a phase inverter for reversing the polarity of the modulation voltage before the application thereof to the receiver for controlling its sensitivity.

Figure 4:
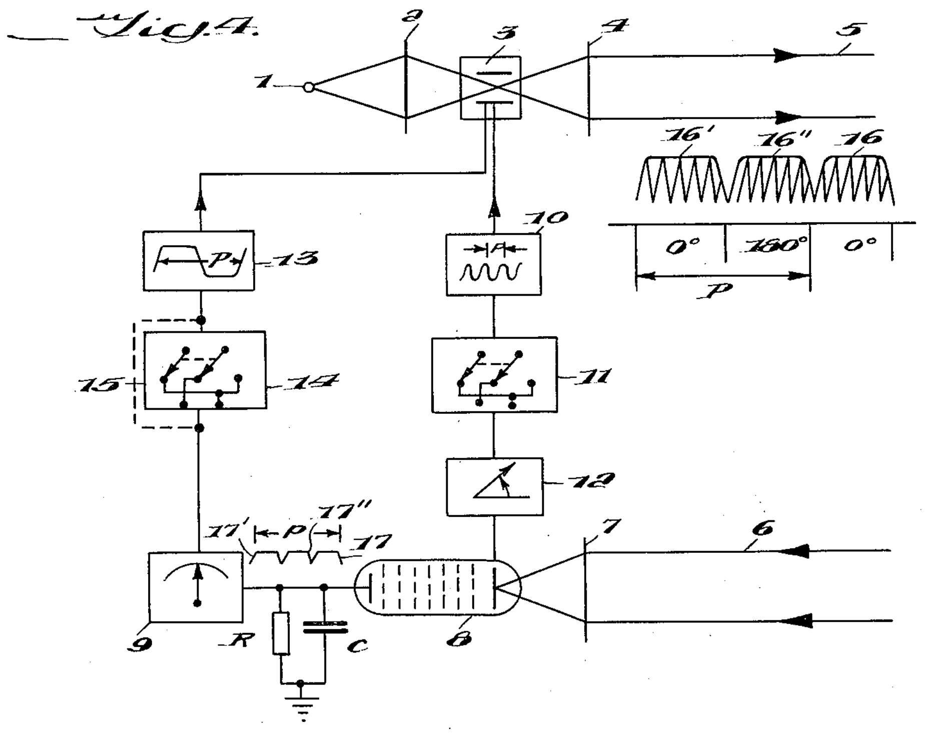

An embodiment of the invention is described in more detail below with reference to the annexed drawings, Figs. 1, 2, 3, 5 and 6 of which serve to explain the operation of the invention, Fig. 4 shows a circuit diagram of the embodiment described and Fig. 7 an example of a circuit diagram for a part of the receiver.

The Fig. 4 distance measuring device comprises a light source 1 transmitting light to a Kerr cell 3 through a collecting lens 2. After passage through the cell, the issuing divergent light beam is collected by a lens 4 and transmitted as a beam 5 towards an object located at the end of the distance to be measured. The beam reflected at the far point returns as a beam 6 and passes through a collecting lens 7 and then impinges on the photo cathode of the photo multiplier 8. The output voltage of the multiplier passes a time constant circuit R, C and is then applied to a measuring instrument 9, the function of which will be set forth below.

For amplitude modulating the emitted light, a modulation voltage is applied to the Kerr cell from a sine-wave generator 10, whose voltage has the period *p*. The modulation voltage is also applied to the multiplier 8 via a phase inverter 11 and an adjustable phase delay device 12.

For periodically reversing the Kerr cell bias, a square wave generator 13 is provided, the output voltage of which is applied to the cell, where it is added to the modulation voltage so that the result is a constant bias changing its polarity with the period P and to which the modulation voltage is added. The square wave is also applied to the measuring instrument 9, which, in a particular embodiment, may be done through a phase inverter 14. However, the square wave voltage may also be applied direct to the measuring instrument 9, as indicated by means of the dash line 15.

The operation of the distance measuring device according to Fig. 4 will now be explained with reference to the curves of Fig. 1, 2, 3 and 5. The curve 16 of Fig. 4 indicates the manner in which the emitted light is amplitude modulated with the oscillation with period *p* from the generator 10. The square wave applied from the generator 13 to the Kerr cell causes a periodic switching of the cell bias from a positive to a negative value, making the bias, for instance, have a positive value during the first half-period of the square wave, indicated with a reference number 16′ in Fig. 4, and negative during the following half-period 16″. If the modulation phase for the transmitted light during the half-period 16′ is 0°, it is therefore during the half-period 16″ 180°, as has already been explained in the opening paragraphs with reference to Fig. 1.

Leaving aside initially what happens during time intervals other than the first half-period 16′, it is evident that the modulation voltage or the corresponding light modulation reaches the receiver multiplier tube 8 via the adjustable phase delay device 12 on the one hand and via the unknown distance to be measured on the other hand. This distance is known if the corresponding phase delay is known, and since the adjustment of the phase delay device 12 is known and has a value corresponding to a predetermined phase difference at the cathode of the tube 8, it is possible to ascertain in this manner the unknown phase delay over the measured distance. With regard to the operation of the tube 8, it is determined, as mentioned above, exclusively by the phase difference referred to, which is the independent variable of Fig. 2, whereas the dependent variable is the mean current in the anode circuit of the tube 8 and is designated $I_m$. The anode circuit has a time constant RC which is long in comparison with $p$ and the output current $I_m$ (or the corresponding voltage) will depend on the phase difference $\phi$ in the manner indicated by the curve D″ of Fig. 2.

During the second half-period 16″ of the square wave a corresponding operation is obtained but having a curve D′ which would in the ideal case be an exact mirror image of the curve D″, but deviates somewhat from this shape owing to the lack of symmetry of the curve B′. The measuring instrument 9 is adapted to produce the difference between the mean output current $I_m$ in subsequent periods 17′ and 17″, which are the portions of the output current curve 17 of the multiplier corresponding to the portions 16′ and 16″, respectively, of the curve 16. This differential measurement is obtained through the application of the square wave to the instrument causing the instrument to respond in the opposite direction during the intervals 17″ as compared to the intervals 17′. This operation can be obtained in any manner known per se. An embodiment will be described in the following in connection with Fig. 7. If the measuring instrument 9 integrates over a plurality of periods P, its reading will evidently be zero when the amplitudes during the intervals 17′ and 17″ have the same value. As is apparent from Fig. 2, the $\phi$ value that has to be adjusted with the aid of the phase delay device 12 is varied somewhat owing to the lack of symmetry in the Kerr cell curve. The correct value corresponds to the intersection between the curves D and D′ but owing to the asymmetry the curve D is replaced with the curve D″ and a displacement $d\phi$ of the intersection takes place.

If now a phase reversal of the modulation voltage takes place by means of the phase inverter 11, this implies that the curves D′ and D″ of Fig. 2 are replaced by curves which are phase displaced 180°, i.e. the curves $D_0'$ and $D_0''$ according to Fig. 3 are obtained. The error $d\phi$ thus changes its sign. Since we are concerned here only with short sections of the sine curves, the occurring variations may be regarded as linear functions of $\phi$ in the manner indicated in Fig. 5, where the measuring instrument reading is shown as a function of $\phi$. The curve $i_1$ is assumed to correspond to Fig. 2. After the switching of the phase inverter 11 there is obtained instead a curve $i_2$, which crosses the zero axis for a different value of $\phi$ and is a decreasing function having the same slope as the increasing function $i_1$. If a phase inversion is performed simultaneously with that of the modulation voltage in the measuring instrument 9, the curve $i_2$ will be replaced by the curve $i_2$ according to Fig. 6, which is otherwise in accordance with Fig. 5. Owing to the linear nature of the short sections of the curves we are concerned with, the correct $\phi$ value will correspond to the intersection between the curves $i_1$ and $i_2$. If the polarity reversal in the measuring instrument according to Fig. 6 is performed, the correct value will correspond instead to the mean value between the curves $i_1$ and $i_2'$, which crosses the zero axis for the correct $\phi$ value.

The actuation of the phase inverter 11 and the switching arrangement incorporated in the measuring instrument 9 for changing the sense of the response of this instrument is performed automatically by mechanical or electrical means of well-known type and the time constant of the instrument 9 is chosen so as to make the instrument represent the mean value of the readings that would have been obtained for each position of the phase inverter 11.

It was assumed in the foregoing that the conductor 15 is in operation and the phase inverter 14 is not utilized. However, it is also possible to perform the phase reversal of the square wave with the aid of the last mentioned phase inverter 14, in which case the conductor 15 is excluded from the circuit. This removes the error that may occur owing to lack of symmetry in the square wave. In this manner, there is obtained after phase inversion in the phase inverter 14 in the manner shown in Fig. 5 a pair of additional curves $i_3$ and $i_4$, one for each position of the phase inverter 11. With the aid of the phase inverter in the measuring instrument 9, the curve $i_4$ may be replaced by the curve $i_4'$, and there are thus obtained in Fig. 6 four parallel curves, the mean value $i_0$ of which represents the desired measured value $\phi$. In this case also the switching is preferably performed automatically by well-known mechanical or electrical means.

Figure 7:
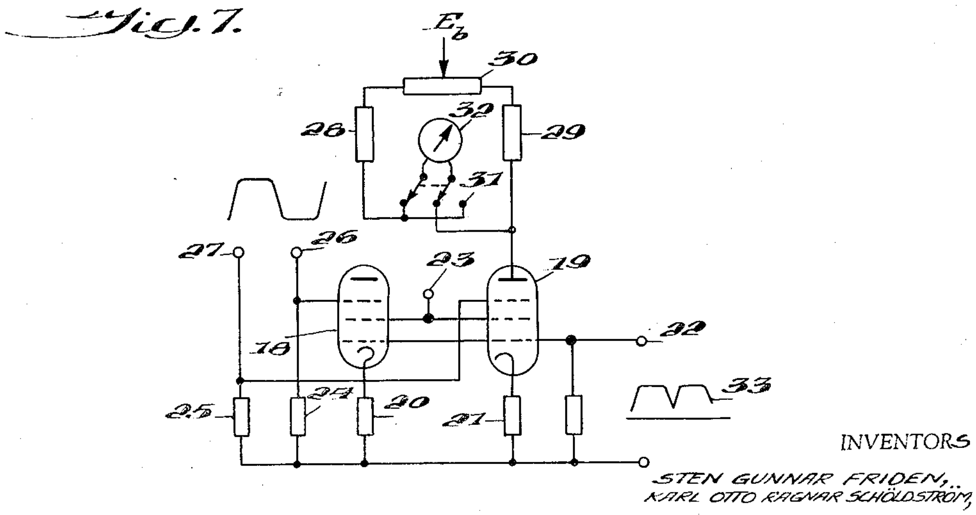

Fig. 7 shows an embodiment of the measuring instrument 9. It comprises a pair of pentodes 18, 19 having their cathodes grounded via resistors 20 and 21, respectively, whereas the control grids are connected to a terminal 22, which is the input terminal for the putput voltage from the photo multiplier 8. The screen grids are connected to a terminal 23, which is connected with the positive end of a voltage source. The suppressor grids are grounded via resistors 24 and 25, respectively, and are connected to terminals 26 and 27, respectively, which serve as input terminals for the square wave. The anodes are connected via resistors 28 and 29, respectively, each to one end of the voltage divider 30 having a tapping connected to the positive pole of a voltage source $E_b$. Between the anodes there is connected via a phase inverter 31 an indicating instrument 32. In case no phase reversal is to take place in the measuring instrument, the phase inverter 31 may be dispensed with.

The operation of the Fig. 7 instrument is as follows: The square wave applied between the terminals 26, 27 makes one of the pentodes conductive at the same time as the other is blocked. The applied output voltage indicated by the curve 33 will thus act on one pentode during the first half-period of the square wave and on the other pentode during the following half-period, on the one pentode during the third half-period and so on. The instrument 32 is assumed to be slow in comparison with these half-periods, so that a zero reading is obtained when equal currents flow through both pentodes.

What is claimed is:

1. A distance measuring device comprising, means for producing a light beam and emitting said light beam through a Kerr cell, means for applying to said Kerr cell a modulation voltage and a bias, the polarity of which is periodically changed so as to cause a phase reversal of the amplitude modulation of the transmitted light, a receiver adapted to pick up the reflected light beam and to be sensitivity-controlled by the modulation voltage, a phase inverter for reversing the polarity of the modulation voltage applied to said receiver and an integrating measuring instrument in said receiver adapted to indicate the mean value of the two indications corresponding to the two positions of said phase inverter.

2. A distance measuring device as claimed in claim 1, including a second phase inverter in said measuring instrument for reversing the polarity of the response of said instrument simultaneously with the polarity reversal of the bias of the said Kerr cell.

3. A distance measuring device as claimed in claim 2, characterized in that said second phase inverter is adapted to be switched simultaneously with said first phase inverter.

4. A distance measuring device as claimed in claim 2, characterized in that the bias of said Kerr cell is applied to control means of said receiver for causing said measuring instrument to respond in different senses during the positive and the negative intervals of said bias.

5. A distance measuring device as claimed in claim 4, characterized by a third phase inverter including means for periodic automatic phase inversion of the Kerr cell bias before the application thereof to said receiver.

6. A distance measuring device as claimed in claim 3, characterized in that the bias of said Kerr cell is applied to control means of said receiver for causing said measuring instrument to respond in different senses during the positive and the negative intervals of said bias.

7. A distance measuring device as claimed in claim 6, characterized by a third phase inverter including means for periodic automatic phase inversion of the Kerr cell bias before the application thereof to said receiver.

References Cited in the file of this patent

"A Preliminary Determination of the Velocity of Light," Bergstrand, Arkiv for Matematik, Astronomi och Fusik, Feb. 1949, band 36A, No. 20, pages 1–11.

"Velocity of Light and Measurement of Distance," Bergstrand, Proceedings of the London Conference on Optical Instruments, 1950, John Wiley and Sons, New York 1952, pages 187–198.